United States Patent [19]
Watson

[11] Patent Number: 5,373,118
[45] Date of Patent: Dec. 13, 1994

[54] HALF NORMAL FREQUENCY REGIME PHASE ENCODING IN CORDLESS DIGITIZERS

[75] Inventor: James S. Watson, Phoenix, Ariz.

[73] Assignee: CalComp Inc., Anaheim, Calif.

[21] Appl. No.: 140,855

[22] Filed: Oct. 25, 1993

[51] Int. Cl.⁵ .................................. G08C 21/00
[52] U.S. Cl. ................................. 178/19; 178/18
[58] Field of Search ............... 178/18.19; 345/179

[56] References Cited

U.S. PATENT DOCUMENTS

| | | | |
|---|---|---|---|
| Re. 34,187 | 3/1993 | Yamanami | 178/19 |
| 4,654,648 | 3/1987 | Herrington | 340/710 |
| 4,754,268 | 6/1988 | Mori | 340/710 |
| 4,777,329 | 10/1988 | Mallicoat | 178/18 |
| 4,795,858 | 1/1989 | Yamazaki | 178/19 |
| 4,796,019 | 1/1989 | Averbach | 340/709 |
| 5,073,685 | 12/1991 | Kobayashi | 178/18 |
| 5,124,509 | 6/1992 | Hoemdervougt et al. | 178/19 |
| 5,134,689 | 7/1992 | Murakami | 395/143 |
| 5,138,118 | 8/1992 | Russell | 178/19 |
| 5,160,813 | 11/1992 | Watson | 178/19 |
| 5,235,142 | 8/1993 | Landmeier et al. | 178/19 |

*Primary Examiner*—Stephen Chin
*Assistant Examiner*—Kevin Kim
*Attorney, Agent, or Firm*—Wm. F. Porter, Jr.; Donald A. Streck

[57] ABSTRACT

A device for imparting a signal phase status of an alternating current (AC) magnetic field signal transmitting from a cursor in a cordless digitizer. The device includes an apparatus for causing the cursor to temporarily emit a signal having a frequency which is lower than the frequency of a basic cursor signal, and an apparatus for determining and imparting the signal phase status of the AC magnetic field signal transmitting from the cursor as derived from the temporarily emitted lower frequency signal.

19 Claims, 4 Drawing Sheets

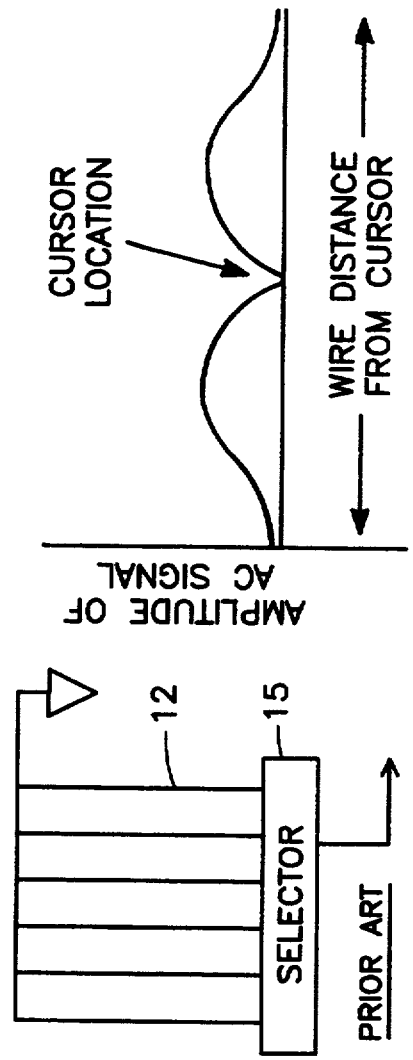
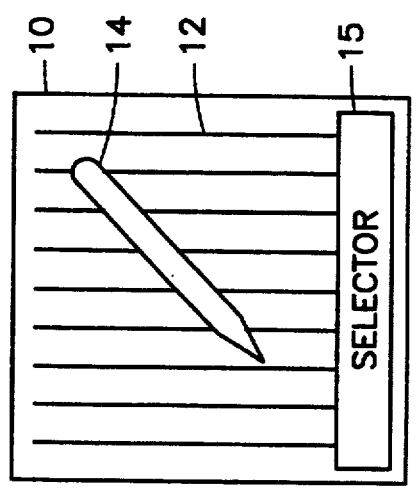
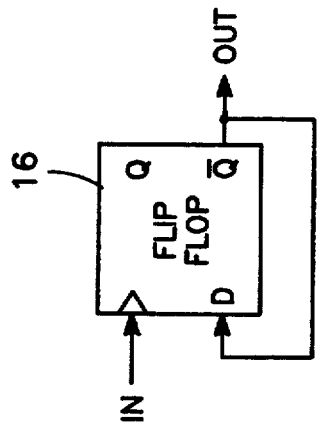
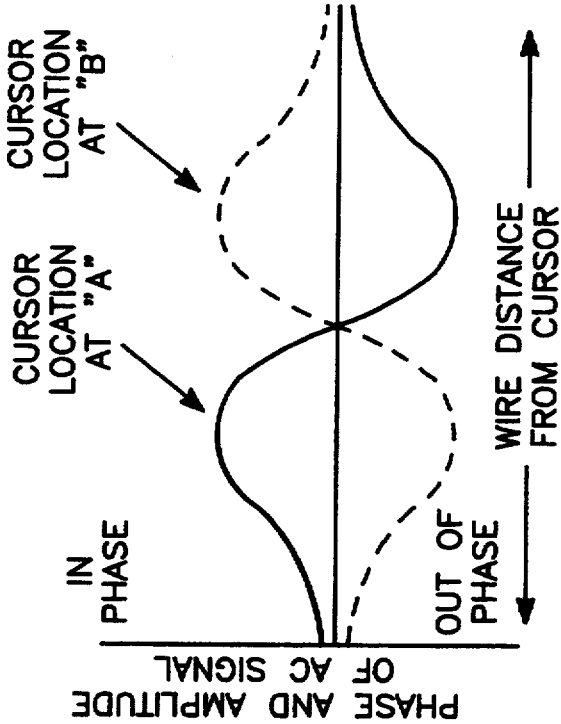
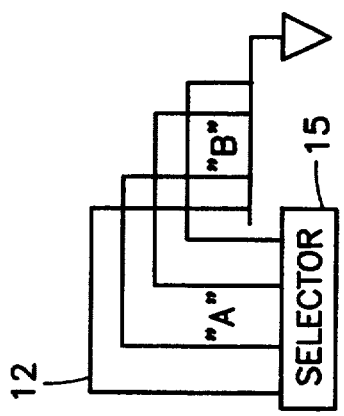
FIG. 1 PRIOR ART
FIG. 2 PRIOR ART
FIG. 3
FIG. 4 PRIOR ART
FIG. 5
FIG. 6 PRIOR ART

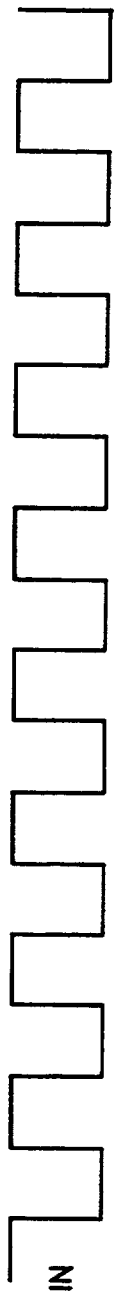
FIG. 7A IN
FIG. 7B Q̄ #1
FIG. 7C Q̄ #2
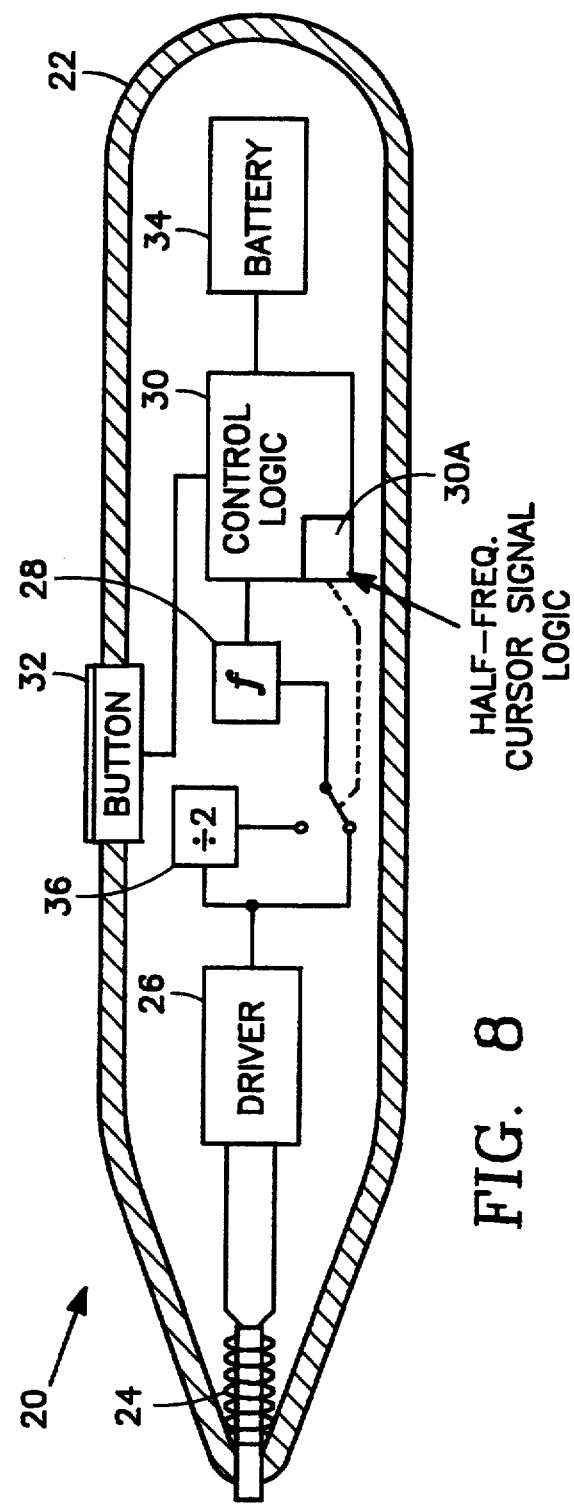
FIG. 8

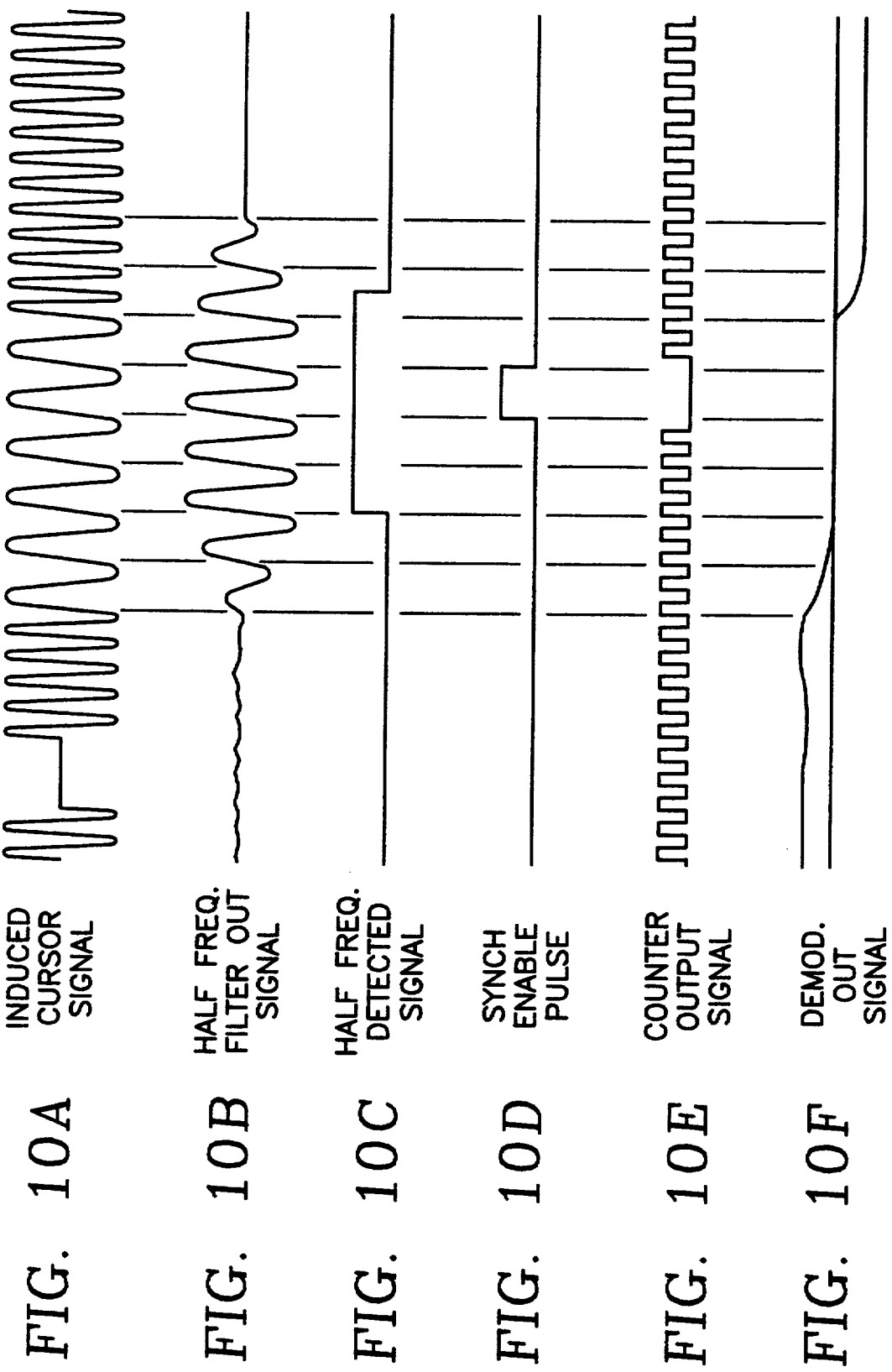

HALF NORMAL FREQUENCY REGIME PHASE ENCODING IN CORDLESS DIGITIZERS

BACKGROUND OF THE INVENTION

1. Technical Field

This invention relates to cordless digitizers and, more particularly, to a device for imparting a signal phase status of a signal transmitting from the cursor.

2. Background Art

Digitizer systems for use as input devices to computers are well known in the art. In a typical digitizer system, a cursor is moved over the working surface of a tablet wherein the working surface of the tablet defines the boundaries of an X-Y coordinate system. Sometimes, the position of the cursor on the working surface of the tablet is determined by electrostatic means. For many reasons, an electro-magnetic sensing link between the cursor and the tablet provides superior results and is preferred.

Recently, so-called "cordless digitizers" in which there is no connecting cable between the cursor and the tablet have become popular. In an electro-magnetic version as manufactured by the assignee of this application and as depicted in simplified form in FIG. 1, the digitizer tablet 10 employs grid conductors 12 for each of the two coordinate directions (only one being depicted for simplicity). The cursor 14 is the "driven" member and emits an alternating current (AC) magnetic field from its tip at a given frequency. The magnetic field emanations induce signals into the grid wires 12 which are then used by the tablet electronics and logic (not shown) to determine the location of the cursor 14. In practice, first the grid conductors 12 for one coordinate direction are individually selected by a selector device 15 and the induced signal therein is sensed. Then the grid conductors 12 for the other coordinate direction are similarly selected and sensed. The amplitude characteristics of the induced signal and its magnitude are used by the tablet electronics and logic to determine how close the cursor is to the grid conductor being sensed. When all the grid conductors have been sampled, the location of the cursor on the tablet's working surface is derived.

In an implementation such as shown in FIG. 2, where any given grid conductor 12 crosses the working surface area only once, an amplitude characteristic associated with the signal induced in the grid conductor by a cursor positioned in the middle of the group of conductors 12 is depicted in FIG. 3. It should be noted that the cursor location is indicated by the null in the plot of the amplitude characteristic.

In a case where a large sensing area is needed, it is often desired that the number of grid conductors 12 be kept at a minimum to simplify construction of the tablet 10 and reduce the manufacturing costs. This is accomplished by having an individual conductor cross the working surface more than once. FIG. 4 shows an implementation of a digitizer where each conductor 12 crosses the working surface of the tablet 10 twice. This configuration results in one leg of a conductor 12 being in one half of the tablet 10 and the other leg being in the other half of the tablet 10. However, an ambiguity as to the position of the cursor 14 arises in such a configuration. The ambiguity results because a cursor 14 placed near one side of a first leg of a conductor 12, will induce a signal in the conductor 12 as viewed from the selector 15 having the same voltage magnitude as the signal induced if the cursor 14 had been placed the same distance from the other leg of the conductor 12. For example, a cursor 14 placed at location "A" in FIG. 4 would induce a signal having an identical voltage magnitude as that induced had the cursor been placed at location "B". Therefore, the aforementioned ambiguity as to the position of the cursor 14 must be resolved in a digitizing system employing conductors 12 which cross the working surface of the tablet 10 more than once.

The ambiguity can be resolved if the phase of the signal induced in the conductors 12 is known relative to the cursor signal. FIG. 5 depicts the amplitude/phase characteristics that would result from a cursor 14 placed at positions "A" and "B" of FIG. 4. As can be seen the phase of the signal induced at location "A" is opposite of the signal induced at location "B". The cursor signal will be in phase with the induced signal at one of the locations and 180 degrees out of phase at the other location. Which location corresponds to which phase is simply a matter of convention and can be made to be either way. Accordingly, by knowing the phase of the cursor signal, the actual location of the cursor 14 can be differentiated from the anomalous location.

In past implementations, a wired connection between the cursor and the tablet was used to determine the phase of the field transmitting from the cursor. However, in a cordless cursor system, alternate means must be employed to acquire this phase information.

According to some prior art techniques, additional pickup conductor loops are incorporated in addition to the necessary position sensing conductors. However, these extra loops require additional conductors on the sensing grid. These extra conductors increase undesirable grid capacitance and make manufacturing the grid more difficult and costly. This technique also requires that the grid employed in a cordless cursor system to be different from that in a corded system. Therefore, a system capable of determining the phase of the cursor signal in a cordless digitizer without the addition of extra conductors is needed.

In another prior art approach invented by the assignee of this application, for which a now co-pending patent application was recently filed, the phase is determined by employing a large first pulse from the cursor. The problem is that under normal circumstances, the cursor emits its signals in bursts. While the phase of the emitted burst is always in the same direction, the tablet electronics and sensing circuitry cannot be sure that the first signal sensed is, in fact, the first signal emitted because the ringing oscillator circuit in the cursor that causes the cursor to emit its magnetic field signal burst starting at a low level and building to its full signal strength. According to the technique of that invention, the ringing oscillator circuit is stimulated with a large initial power surge which causes the first (i.e. known phase) output to be at a guaranteed sensible level. Thus, the tablet knows that the first waveform of the sensed signal is the first emitted waveform of known phase and the phase of the remaining signal can be determined therefrom.

While the large first pulse approach of that invention appears to work well for its intended purpose, there is some concern that under certain circumstances and configurations, as associated with pen-driven computing combined display and input devices in particular, the large first pulse approach may be susceptible to noise problems.

Wherefore, it is the object of this invention to provide an alternate approach for determining the phase of the magnetic field transmitting from a cursor in a cordless digitizer system employing conductors which cross the working surface more than once.

Other objects and benefits of the invention will become apparent from the detailed description which follows hereinafter when taken in conjunction with the drawing figures which accompany it.

SUMMARY OF THE INVENTION

The foregoing object has been attained by a device for imparting a signal phase status of a basic alternating current (AC) magnetic field signal transmitting from a cursor in a cordless digitizer.

The device includes an apparatus for causing the cursor to temporarily emit a signal having a frequency which is one-half the frequency of a basic cursor signal, and an apparatus for determining and imparting the signal phase status of the basic AC magnetic field signal transmitting from the cursor from a signal induced in a conductor by the signal transmitting from the cursor, using the temporarily emitted signal having the frequency one-half that of the basic cursor signal frequency.

The purpose for using a half frequency signal derives from the fact that the rising edges of the full frequency signal occur on the transitions of the half frequency signal. Therefore, the phase of the full frequency cursor signal can be determined by detecting the transition points in the half frequency signal induced in the tablet conductors. It does not matter if the phase of the induced half frequency signal is inverted by 180 degrees due to looping of the conductors, because the transitions in the signal, rising or falling, will still occur at the rising edges of the full frequency cursor signal. Accordingly, the above described process of determining the cursor signal's phase to resolve the position ambiguity, is made possible by comparing the occurrence of the transition points in the induced half frequency signal to the induced full frequency signal induced in a conductor. If the induced half frequency signal transitions match up with the rising edges of the induced full frequency signal, it is known that the induced full frequency signal is approximately in phase with the corresponding cursor signal. If, however, the induced half frequency signal transitions occur at the falling edges of the induced full frequency signal, it is instead known that the induced full frequency signal is approximately 180 degrees out of phase with the cursor signal. This information is then used by the digitizer tablet electronics to determine the actual location of the cursor. It is noted that even though a half-frequency signal is preferred, other lower frequencies created from the full-frequency signal, such as a quarter-frequency signal, would act in the same way.

The cursor includes the usual basic cursor signal frequency generator for generating a signal having a predetermined frequency from its output. A device connected to this output creates and emits from the cursor an AC magnetic field signal having a frequency equivalent to a frequency of the signal input into it. However, in order to produce the preferred half frequency cursor signal, the apparatus responsible incorporates a number of novel components into the cursor. These include a divide-by-two circuit for outputting a signal which has a frequency one-half that of a signal put into it, a device for switching the signal generated by the basic cursor signal frequency generator from the AC magnetic field signal creating and emitting device to an input of the divide-by-two circuit, half-frequency cursor signal logic for controlling the switching device and causing the signal output from the basic cursor signal frequency generator to be temporarily switched to the input of the divide-by-two circuit, and a device for connecting the output of the divide-by-two circuit to the AC magnetic field signal creating and emitting device thereby causing it to emit an AC magnetic field signal having a frequency one-half that of the signal generated by the basic cursor signal frequency generator. In addition, the half frequency cursor signal logic includes logic which causes the above described temporary switching of the signal output from the basic cursor signal frequency generator to the input of the divide-by-two circuit device at a time immediately preceding the emitting of a burst of full frequency signal of sufficient duration for cursor position to be calculated by the digitizing tablet.

The signal from the aforementioned determining and imparting apparatus is used by the tablet to create a reference signal having the same phase and frequency as the cursor full frequency signal by utilizing the half frequency signal emitted by the cursor. The apparatus includes a half frequency detection device with an input connected to the conductor through one of the selectors. This device is used for isolating the half frequency signal induced in the conductor by the cursor emanations from a remaining portion of the signal which is at a frequency equal to that of the basic cursor frequency. In addition, the device is used for detecting the isolated half frequency signal and outputting a signal having a voltage consistent with a predetermined high logic level employed in the determining and imparting apparatus whenever the half frequency signal is detected. The device also outputs a copy of the isolated half frequency signal. The determining and imparting apparatus further includes a synch pulse generator having first and second inputs respectively connected to the first and second outputs of the half frequency detection device. This generator is used for outputting a single pulse having a voltage consistent with the high logic level and which is in phase with the isolated half frequency signal. The single pulse is generated from the signal obtained from the first and second outputs of the half frequency detection device. Lastly, the apparatus includes a cursor phase reference signal generator which has a first and second input respectively connected to the output of the synch pulse generator device and an output from the conductor containing a copy of the signal induced in the conductor by the AC magnetic field signal transmitting from the cursor. This generator is used for generating a cursor phase reference signal which has essentially the same frequency as the basic cursor signal, and which is approximately in phase with the basic cursor signal. The cursor phase reference signal is formed from the signal obtained from the synch pulse generator and the conductor.

This aforementioned reference signal is then used to indicate the phase of the basic cursor signal, thereby assisting in the process of determining the cursor's location on the working surface of the digitizer tablet. Accordingly, the object of this invention has been fulfilled.

It should also be noted that in one version of the present invention the plurality of conductors which form the two coordinate system are connected to first and second selector devices such that the conductors in one coordinate direction are connected to the first selector device and the conductors in the other coordinate direction are connected to the second selector device. Each selector device has an output which is switchably connected to each conductor connected to that selector device thereby enabling an individual conductor to be connected to the output exclusive of the other conductors. Selector logic is included which is connected to the first and second selector devices and used for controlling a switch to select one of the selector devices so that the output therefrom is connected to the input of the half frequency detection device and the second input of the cursor phase reference signal generator. The selector logic also individually selects each conductor connected to the selected selector device, samples the magnitude of the signal carried therein, and identifies a conductor having a signal magnitude larger than a predetermined minimum. The selector logic then controls the switching of a conductor having the requisite magnitude to the selector's output. The signal from the conductor is thereby routed to the input of the half frequency detection device and the second input of the cursor phase reference signal generator. In this way the signal used to create the cursor phase reference signal is of sufficient magnitude to facilitate the aforementioned comparison process.

It is also noted that alternate devices for indicating the phase of a cursor signal using an induced lower frequency signal are disclosed in co-pending U.S. applications Ser. No. 08/140,841 filed on Oct. 25, 1993 by James S. Watson and Andrew M. Harris entitled "CORDLESS TRANSDUCER PHASE REFERENCE AND DATA COMMUNICATION METHOD FOR DIGITIZERS", which is assigned to the assignee of the present application.

DESCRIPTION OF THE DRAWINGS

FIG. 1 is a simplified diagram of a cordless digitizer system.

FIG. 2 is a simplified diagram of the digitizer tablet of FIG. 1 wherein the conductors cross the working surface only once.

FIG. 3 is a simplified graph of the signal obtained from a conductor of FIG. 2.

FIG. 4 is a simplified diagram of the digitizer tablet of FIG. 1 wherein the conductors cross the working surface twice.

FIG. 5 is a simplified graph of the signal obtained from a conductor of FIG. 4.

FIG. 6 is a diagram of a divide-by-two flip flop and its connections.

FIGS. 7a–c are graphs of contemporaneous waveforms of the signals associated with the divide-by-two flip flop of FIG. 6.

FIG. 8 is a simplified diagram of a cordless cursor.

FIGS. 10a–f are graphs of contemporaneous waveforms of an induced cursor signal, half-frequency filter out signal, half-frequency detected signal, synch enable pulse, counter output signal, and demod out signal, respectively, associated with the tablet of FIG. 9.

DETAILED DESCRIPTION OF THE INVENTION

Figure 9:
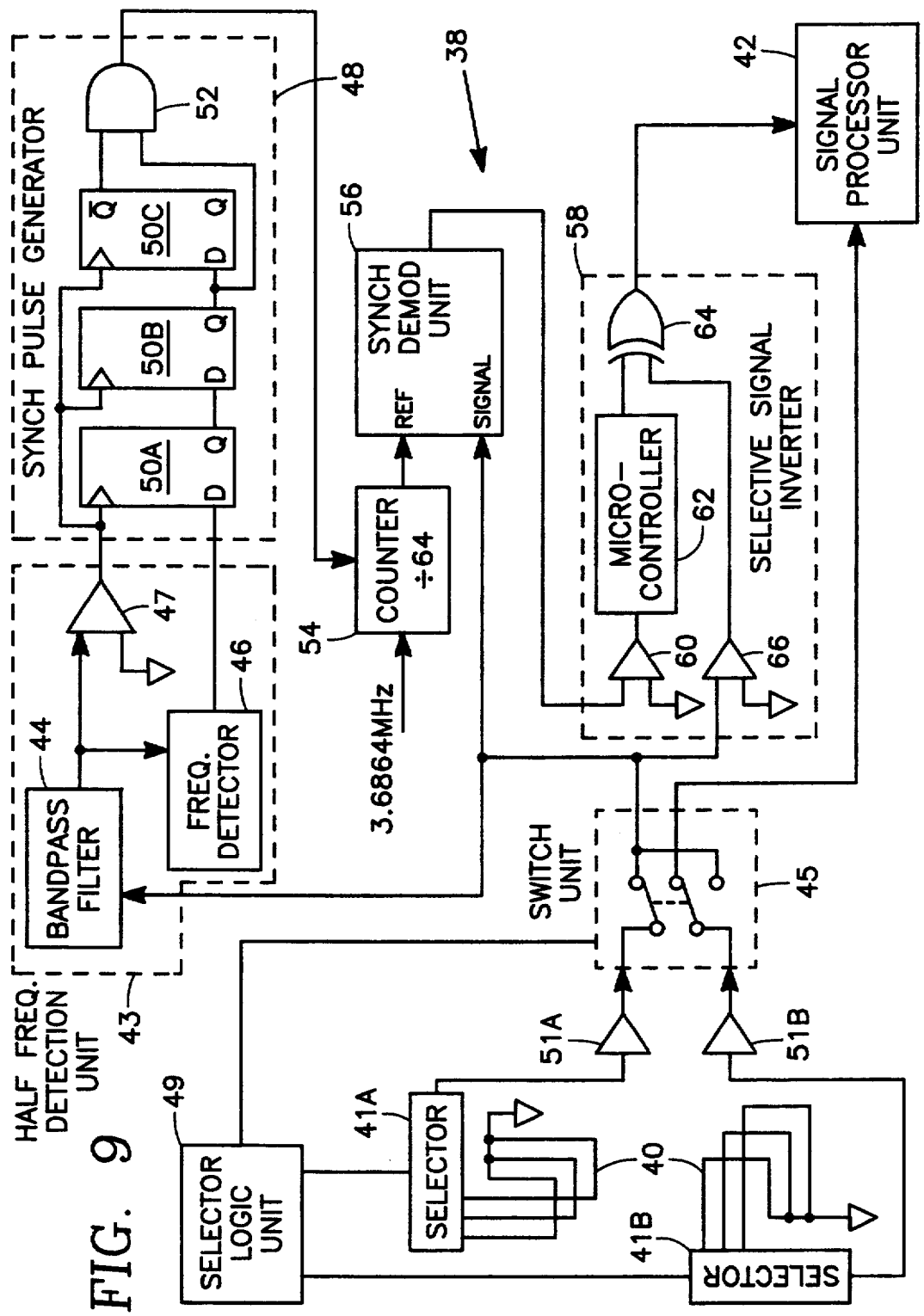
FIG. 9 is a schematic diagram of a tablet associated with the cordless cursor of FIG. 8.

The present invention is based on the phenomenon depicted in FIGS. 6 and 7a–c. FIG. 6 depicts a well-known prior art divide-by-two flip flop 16, FIG. 7a depicts a square wave input providing binary pulses at a frequency "f", and two possible corresponding outputs at inverse Q are shown as FIGS. 7b and 7c, respectively. The outputs shown in FIGS. 7b and 7c are 180 degrees out of phase with each other. In addition, since the flip flop 16 is configured as a divide-by-two flip flop, the two possible Q outputs are binary square wave pulses at a frequency f/2.

The phenomenon of interest is the fact that regardless which of the outputs that is utilized, the rising edges of the input frequency f occurs on the transitions of the f/2 output frequency created from the higher frequency signal. To employ this phenomenon to advantage in the cordless digitizer environment, therefore, what is needed is a system in which a lower frequency cursor signal is generated from a higher frequency cursor signal preferably by halving the frequency. Then, the phase of the higher frequency cursor signal can be determined by detecting the transition points in a lower frequency signal induced in the grid conductors 12 of the digitizer tablet 10 by the lower frequency cursor signal, and knowing that these transitions correspond to the rising edges of the higher frequency cursor signal. It does not matter if the phase of the induced lower frequency signal detected in the grid conductor 12 is inverted by 180 degrees due to the looping of the conductors 12 across the working surface. The transitions in the lower frequency induced signal will still occur at the rising edge of the higher frequency cursor signal.

Therefore, the above described process of determining the cursor signal's phase to resolve the position ambiguity, is made possible by comparing the occurrence of the transition points in the induced lower frequency signal to a signal "mirroring" the induced full-frequency signal induced in a conductor 12. The preferred method of creating the "mirrored" induced full-frequency signal is to use the signal when present to create a reference signal having the same frequency and phase. If the induced lower frequency signal transitions match up with the rising edges of the induced higher frequency signal, it is known that the induced higher frequency signal is approximately in phase with the corresponding cursor signal. If, however, the induced lower frequency signal transitions occur at the falling edges of the induced higher frequency signal, it is instead known that the induced higher frequency signal is approximately 180 degrees out of phase with the cursor signal. As described above, this information is then used by the digitizer tablet electronics to determine the actual location of the cursor. Even though the case where a half-frequency signal is employed is preferred, it is noted that other lower frequency signals could also be employed with the same result. For example, a one-quarter frequency signal would behave in the same way.

Digitizer apparatus according to the preferred version of the present invention is shown in FIGS. 8 and 9 with typical corresponding waveforms associated therewith depicted in FIGS. 10a–f.

Turning first to the cursor 20 of FIG. 8, there are the usual components within the case 22. In particular, they include an AC magnetic field generating coil 24, a driver 26 for driving the coil 24, a basic frequency generator 28, control logic 30, a user-operable selection button 32, and a battery 34 for providing the power. For purposes of the preferred version of the present invention, there is also a divide-by-two circuit 36 connected to the basic frequency generator 28, and the control logic 30 includes a half-frequency cursor signal logic 30a which controls the signal generator 28 as described below. The cursor outputs a magnetic field signal burst from the coil 24 when activated. This burst is made up of a portion at the basic cursor frequency which is encoded indicating the status of the button 32. The half-frequency cursor signal logic 30a then causes the basic driving frequency f from the frequency generator 28 to be temporarily routed through the divide-by-two circuit 36 so that the coil 24 outputs a short portion at half-frequency for perhaps ten cycles or so. This is immediately followed by the remaining portion of the burst at the basic cursor frequency. This last portion acts as the signal used by the digitizer tablet to ascertain the cursor location on the tablet's working surface. Having thus created the half frequency signal by dividing the basic frequency signal by two, so as to facilitate employing the above mentioned phenomenon, the balance of the present invention takes place in the digitizer tablet 38 where phase determination is required. It is also noted that the divide-by-two circuit can be any appropriate circuit including the flip-flop as depicted in FIG. 6 or a digital counter.

Turning to the tablet 38 of FIG. 9, there are the usual sensing grids 40 connected to a selector device 41a, 41b in each of the coordinate directions. The output of each selector device 41a, 41b is amplified via a separate amplifier 51a, 51b. The amplified output of either selector device 41a, 41b may be connected to the signal processing unit 42. A waveform representative of the induced cursor signal which is output from the selector device 41a, 41b is depicted in FIG. 10a. Of course, as discussed above, the actual waveform could also be skewed 180 degrees from the one shown. In addition, to provide the aforementioned signal phase information via the present invention, the output of either selector device 41a, 41b can also be connected through the amplifier 51a, 51b, to a half frequency detection unit 43 which is comprised of a bandpass filter 44, frequency detector 46, and a comparator 47. The amplified output from the selector device 41a, 41b is first routed to the input of a bandpass filter 44 which blocks all signals except the half frequency cursor signal induced in the grid conductors by the cursor. The half frequency filter output waveform of the filter 44 is depicted in FIG. 10b.

It should be noted that in the preferred version of this invention, the selector devices 41a, 41b are switched by a switching unit 45 such that when one is providing a signal through an amplifier 51a, 51b to the signal processing unit 42, the other is connected through an amplifier 51a, 51b to the filter 44. Therefore, the cursor signal induced in a selected grid conductor 40 which is directly transferred to the signal processing unit 42 is not the same signal routed to the filter 44. The purpose for this feature of the present invention is to select a grid conductor 40 with a relatively large magnitude signal as the copy of the induced cursor signal to be provided to the filter 44. This ensures a strong, clear signal is provided for the previously mentioned phase determination process. The selector logic unit 49 which is used to control the selector devices includes additional logic whereby, while one selector 41a, 41b is providing a signal to the signal processing unit 42 for phase comparison and extracting cursor location data, the other selector 41a, 41b searches for and provides a copy of the induced cursor signal from a grid conductor 40 which has a large magnitude signal in relation to the other grid conductors 40 connected to that selector device 41a, 41b. This selected signal can be, but need not be the largest signal available, as long as the signal is one that is relatively strong and clear. The methods and devices employed to create such additional logic functions are well known in the art. Therefore, no detailed description of these additional logic features is included herein.

The filter 44 output is connected to the input of a frequency detector 46 and to one of the two inputs to a comparator 47. The frequency detector 46 is capable of detecting a signal with a frequency essentially equal to that of the induced half frequency cursor signal, and outputting a frequency detected signal at a high logic level voltage. When no such signal is detected, the detector 46 outputs a low logic level signal. The operation of the frequency detector 46 is such that the frequency detected signal is initiated at approximately the middle of the half frequency filter output waveform, as depicted in FIG. 10c. This signal has been labeled the half frequency detected signal. The other input to the comparator 47 is connected to ground. In this way, if a signal is passed by the filter 44 and so input into the comparator 47, the comparator 47 outputs a high logic level signal during those periods where the voltage of the signal is more than ground voltage and a low logic level signal when the voltage of the signal is less than ground. Thus a digital representation of the half-frequency filter output is created for further processing as described below.

The output of the frequency detector 46 and the comparator 47 are connected to the two inputs of a synch pulse generator 48. The synch pulse generator 48 processes these inputs and outputs a single digital pulse whose transitions correspond to the transitions of the induced half frequency signal. FIG. 10d depicts the single pulse which has been labeled the synch enable pulse. A variety of circuits will perform this function, and are well known in the art. One possible circuit is shown inside the block depicting the synch pulse generator 48 in FIG. 9. However, it is not intended that the present invention be limited to the particular circuit depicted, and it is noted that any suitable circuit may be employed.

The synch pulse generator circuit depicted in FIG. 9 consists of a series of three flip-flops 50a–c, along with an AND gate 52. The output of the comparator 47 is connected to the clock inputs of each flip flop 50a–c. The output of the frequency detector 46 is connected to the D input of the first flip flop 50a. The Q output of the first flip flop 50a is connected to the D input of the second flip flop 50b. The Q output of the second flip flop 50b is connected to one of two inputs to the AND gate 52, and also to the D input to the third flip flop 50c. The inverse Q output of the third flip flop 50c is connected to the other input to the AND gate 52. The initial states of the flip flops 50a–c are such that a low exists at the Q output of the second flip flop 50b and a high exists at the inverse Q output of the third flip flop 50c. Therefore, initially, one input to the AND gate 52 is low and the other high, producing no output from the gate 52. As long as the output of the frequency detector 46 is low, a low is propagated through the flip flops 50a–c and the input conditions at the AND gate 52 do not change. However, when the output of the frequency detector 46 goes high after detecting a half frequency signal input, and the flip flops 50a–c are repeatedly clocked by the comparator 47, a high is propagated from the first flip flop 50a to the second flip flop 50b. After two clock pulses, the Q output of the second flip flop 50b goes high. This causes both inputs to the AND gate 52 to be high, as the inverse Q of the third flip flop 50c is still high. Accordingly, a logic high pulse is transmitted from the output of the AND gate 52. On the third clock pulse when the half frequency detected signal is high, the inverse Q of the third flip flop 50c goes low and the AND gate 52 shuts down. This condition will persist for the duration of the high half frequency detected signal. Consequently, one pulse is output from this circuit having a duration equal to one cycle of the half frequency signal whenever the induced half frequency cursor signal is detected. In addition, the rising edge of the pulse will coincide with the rising edge of the induced half frequency signal and the falling edge of the pulse will also coincide with the rising edge of the induced half frequency signal.

The output of the synch pulse generator 48 is connected to the counter 54. The counter 54 is a free-running divide-down counter which outputs a digital pulse stream whose frequency is essentially equal to the basic cursor frequency f. In the preferred version of this invention the counter 54 is driven by a signal with a frequency of 3.6864 MHz so as to take advantage of existing frequency generating sources in the existing digitizer tablets manufactured by the assignee of this invention. This driving frequency signal is divided down by the operation of the counter 54 to the basic cursor frequency f. In the preferred version of this invention, the basic cursor frequency is 57.6 kHz, i.e. 1/64 of the driving frequency. The aforementioned synch enable pulse from the synch pulse generator 48 is used to adjust the phase of the signal output from the counter 54 to essentially match that of the basic cursor signal.

This phase adjustment occurs as follows. Since the synch enable pulse's rising and falling edges correspond to the rising edges of the induced half frequency signal, and either edge of the induced half frequency signal corresponds to the rising edge of the basic cursor signal, the synch enable pulse's transition points must correspond to the rising edges of the basic cursor frequency. This is so because as described above, the original half frequency cursor signal had this same relationship to the basic cursor frequency f. Also as described above, it does not matter if the induced half frequency cursor signal detected was inverted in phase from the original half frequency cursor signal due to the looping of the grid conductors 40, as the transitions still occur at the rising edge of the basic cursor frequency f. The counter 54 is reset by synch enable pulse, and begins counting again only after the high logic level signal associated with the synch enable pulse is removed. The counter 54 will then output a signal approximately matching the frequency of the basic cursor signal. However, this signal will be 180 degrees out of phase with the basic cursor signal due to the delay between the end of the synch enable pulse and the first pulse output from the counter after being restarted. This effectively synchronizes the phase of the counter output to the inverse of the basic cursor frequency signal. The output waveform from the counter 54 is depicted in FIG. 10e.

If the instantaneous frequency of the signal produced by the cursor's basic frequency generator 28 were exactly the same as the signal output by the counter 54, at all times, then this signal could be fed directly into the signal processing unit 42 where its phase could be compared to the unprocessed signal taken directly from the amplifier 51a, 51b of the selector device 41a, 41b to differentiate the aforementioned anomalous cursor position data. However, in reality the basic cursor frequency will not exactly match that of the counter output signal because separate frequency generators are involved. The cursor has one frequency generator 28 driving the coil and the digitizer tablet has another driving the counter 54. The frequency generators, both being crystal controlled will match only within 250 parts per million. So at the preferred basic cursor frequency of 57.6 kHz, for instance, the frequency difference between the two generators could be as large as 15 Hz which equates to a drift rate in the phase between the two signals of 5.2 degrees/msec. Eventually, the difference in the phase between the basic cursor frequency signal and the counter output signal, due to the cumulative effect of the phase drift, would make the differentiation of the apparent cursor positions impossible using the prior art phase comparison circuit in the digitizer tablet's signal processing unit 42. It must be remembered that this prior art comparison circuit was designed to use phase information transferred via a wired connection to the cursor, where no phase drift would exist. Accordingly, the inherent phase drift precludes the direct use of the counter's output signal as a reference for the differentiation of the cursor positional data signal.

However, the counter's output signal can be used to demodulate a copy of the induced cursor output signal to create a cursor phase reference signal which is compatible with the prior art signal processing unit circuitry, in that it would mirror the signal typically received via a wired connection between the cursor 14 and the signal processing unit 42. This process involves using the counter output to decide if the induced cursor signal is closer to being in phase with the actual cursor output, or is one of the inverted phase signals due to the looping of the grid conductors 40. If it is determined that the induced cursor signal is closer to being in phase, it is routed unchanged to the signal processing unit 42 for phase comparison. If it is determined the induced cursor signal is closer to being skewed in phase by 180 degrees, the signal is inverted before being routed to the signal processing unit 42.

According to the techniques of the present invention, the aforementioned demodulation of the induced cursor signal is accomplished via a synch demodulator unit 56 and a selective signal inverter device 58. The output of the counter 54 is connected to a "phase reference" input of a synch demodulator unit 56, and the "signal" input to the synch demodulator unit 56 is connected to the amplified output of the selected selector device 41a, 41b. When the induced signal from the selector device 41a, 41b corresponds to the full-frequency cursor regime, the unit 56 processes the two signals such that a positive voltage is produced if the counter output signal and the selected selector device signal are closer to being in phase with each other, and a negative voltage if the two signals are closer too being 180 degrees out of phase with each other. The first instance corresponds to the case where the induced full frequency signal is 180 degrees out of phase with the basic cursor signal, and the later instance corresponds to the case where the induced full frequency signal is in phase with the basic cursor signal. This relationship results from the counter output being 180 degrees out of phase with the basic cursor signal. The waveform depicted in FIG. 10f shows the synch demodulator unit output. It should be noted that the absence of a signal in the middle portion of the waveform is due to the absence of the full frequency signal and has no effect on the operation of this invention. The circuits and components to accomplish this function are well know to those skilled in the art and commercially available, therefore, exhaustive details of the construction of this circuit will not be included herein in the interest of simplicity. However, in the preferred version of this invention a standard HC 4053 switch unit with a low pass filter connected to the output thereof is employed as the synch demodulator unit 56. The induced signal from the selected selector unit 41a, 41b and amplifier 51a, 51b is injected into to one pole of the switch and an inverted version of this signal is injected into the other pole of the switch. The switching between these two signals is controlled by the counter output signal. Therefore, if the induced signal during the cursor's full-frequency regime is nearly in phase with the counter output, then the switching action results in a rectified signal being output having an average positive voltage. Accordingly, the output of the low pass filter will be the direct current (DC) component of the signal having a positive voltage. However, if the induced signal is close to being 180 degrees out of phase with the counter output, the switching action results in a rectified signal having an average negative voltage. Accordingly, the output of the low pass filter has a negative voltage.

The output of the synch demodulator unit 56 is connected to the selective signal inverter device 58. As mentioned above, the device 58 selectively inverts a copy of the induced cursor signal from the selected selector device 41a, 41b and amplifier 51a, 51b. If the induced cursor signal is closer to being in phase with the actual cursor signal, no inversion takes place. However, if the two signals are closer to being 180 degrees out of phase, the induced cursor signal is inverted to match the phase of the actual cursor signal.

In the preferred version of this invention, the copy of the induced cursor signal employed to create this cursor phase reference signal, which is then transferred to the signal processing unit 42 for the comparison process described previously, originates from the selector 41a, 41b and amplifier 51a, 51b which also supplies a signal to the filter 44. In this way a relatively large magnitude signal is selected as the copy of the induced cursor signal to be converted into the cursor phase reference signal, so as to provide a strong, clear signal for the comparison process.

A variety of circuits will perform this inversion function of the selective signal inverter device 58, and are well known in the art. One possible circuit is shown inside the block depicting the inverter device 58 in FIG. 9. However, it is not intended that the present invention be limited to the particular circuit depicted, and it is noted that any suitable circuit may be employed. In the depicted circuit the output of the synch demodulator unit 56 is connected to one of two inputs to a comparator 60. The other input to the comparator 60 is connected to ground. In this way the comparator 60 outputs a high logic level signal during those periods where the voltage of the signal from the demodulation unit 56 is more than ground voltage and a low logic level signal when the voltage of the signal is less than ground. The logic signal output from the comparator 60 is connected to the input of a microcontroller 62. The microcontroller 62 is thus informed of whether the induced cursor signal is closer to, in or 180 degrees out of phase, with the actual cursor signal. It should be remembered that a low logic level corresponds to an in phase condition, whereas a high logic level corresponds to an inverted phase condition. As mentioned above, if the two signals are closer to being in phase, the induced cursor signal is routed unchanged to the signal processing unit 42 for phase comparison. However, If the two signals are closer to being skewed in phase by 180 degrees, the induced cursor signal is inverted before being routed to the signal processing unit 42. As the signal indicating the cursor's position follows immediately after the synchronizing half frequency cursor signal, this decisional process to invert the induced cursor signal, or not, occurs before any significant phase drift has occurred between the counter output and the cursor signal.

The selective signal inversion is accomplished as follows. An output from the microcontroller 62 is connected to one of two inputs to an exclusive OR gate 64. The aforementioned large magnitude copy of the induced cursor signal is feed into one input to a comparator 66. The other input to the comparator 66 is tied to ground. Thus, if the induced cursor signal has a positive voltage a high logic level signal is output by the comparator 66, and if the induced cursor signal has a negative voltage a low logic level signal is output. The output of the comparator 66 is connected to the other input of the exclusive OR gate 64. If the microcontroller 62 detects that the induced cursor signal is closer to being in phase with the actual cursor signal, it puts the input to the gate 64 at a low logic level condition. Therefore, if the induced cursor signal at the other gate input is high, a high is output by the gate 64, and if the induced cursor signal is low, a low is output by the gate 64. Consequently, the signal output from the gate 64 is not inverted. However, it is squared up into a digital type signal to further facilitate the comparison process in the signal processing unit 42. On the other hand, if the microcontroller 62 detects that the induced cursor signal is closer to being 180 degrees out of phase with the actual cursor signal, it puts the input to the gate 64 at a high logic level condition. Therefore, if the induced cursor signal at the other gate input is high, a low is output by the gate 64, and if the induced cursor signal is low, a high is output by the gate 64. Consequently, the signal output from the gate 64 is inverted.

While the invention has been described in detail by reference to the preferred embodiment described above, it is understood that variations and modifications thereof may be made without departing from the true spirit and scope of the invention.

Wherefore, what is claimed is:

1. A device for imparting a signal phase status of a basic alternating current (AC) magnetic field signal transmitting from a cursor in a cordless digitizer having a tablet with a grid of conductors, and wherein the basic AC magnetic field signal induces a corresponding signal in the grid of conductors, the device comprising:
   a) a means for causing the cursor to temporarily emit a signal having a frequency which is lower than the frequency of a basic cursor signal instead of the basic AC magnetic field signal; and,
   b) a means for determining and imparting the signal phase status of the basic AC magnetic field signal transmitting from the cursor from a signal induced in the grid of conductors of the tablet by the signal transmitting from the cursor, using the temporarily emitted lower frequency signal.

2. The device for imparting the signal phase status of claim 1, wherein the cursor includes a basic cursor signal frequency generator for generating a signal having a predetermined frequency from an output thereof and a means connected to the output of the basic cursor signal generator which creates and emits from the cursor an AC magnetic field signal having a frequency equivalent to a frequency of a signal input into it, and wherein the lower frequency cursor signal means comprises:

a) a divide-by-two circuit means for outputting a signal which has a frequency one-half that of a signal input into it;

b) a means for switching the signal generated by the basic cursor signal frequency generator from the AC magnetic field signal creating and emitting means to an input of the divide-by-two circuit means;

c) a half frequency cursor signal logic means which controls the switching means and causes the signal output from the basic cursor signal frequency generator to be temporarily switched to the input of the divide-by-two circuit means; and, d) a means for connecting an output of the divide-by-two circuit means to the AC magnetic field signal creating and emitting means to cause the emitting of an AC magnetic field signal having a frequency one-half that of the signal generated by the basic cursor signal frequency generator.

3. The device for imparting the signal phase status of claim 2, wherein the half frequency cursor signal logic means includes additional logic means to cause the temporary switching the signal output from the basic cursor signal frequency generator to the input of the divide-by-two circuit means at a time immediately preceding an emitting of a signal used to determine cursor position, thereby temporarily causing said AC magnetic field signal emitted from the cursor to have a frequency one-half that of the signal generated by the basic cursor signal frequency.

4. The device for imparting the signal phase status of claim 2, wherein the determining and imparting means comprises:

a) a half frequency detection means including an input connected to said conductor for, a1) isolating the half frequency signal induced in the conductor from a remaining portion of a signal induced in the conductor by the cursor emanations, the remaining portion having a frequency equal to that of the basic cursor frequency, a2) detecting the isolated half frequency signal, a3) outputting from a first output a signal having a voltage consistent with a predetermined high logic level employed in the determining and imparting means when said half frequency signal is detected, and, a4) outputting from a second output a copy of the isolated half frequency signal;

b) a synch pulse generator means, including first and second inputs respectively connected to the first and second outputs of the half frequency detection means, for outputting at an output a single pulse having a voltage consistent with the high logic level and whose transitions correspond to transitions of the induced half frequency signal, said single pulse being generated from the signals obtained from the first and second outputs of the half frequency detection means; and, c) a cursor phase reference signal generator means, including a first and second input respectively connected to the output of the synch pulse generator means and an output from the conductor containing a copy of the signal induced in said conductor by the AC magnetic field signal transmitting from the cursor, for generating a cursor phase reference signal at an output which has approximately the same frequency as and a known phase relationship to the basic cursor signal, said cursor phase reference signal being generated from the signal obtained from the synch pulse generator means and the conductor.

5. The device for imparting the signal phase status of claim 4, wherein the cordless digitizer includes a plurality of said conductors which form a two coordinate grid, the device further comprising:

a) a first and second selector device such that the conductors in one coordinate direction are connected to the first selector device and the conductors in the other coordinate direction are connected to the second selector device, each selector device having an output which is switchably connected to each conductor connected to the selector device such that an individual conductor can be connected to the output exclusive of the other conductors;

b) a selector logic means connected to the first and second selector devices for selecting one of the selector devices such that the output therefrom is connected through an amplifier to the input of the half frequency detection means and the second input of the cursor phase reference signal generator means, and wherein said selector logic means includes:

b1) a means for individually selecting each conductor connected to the selected selector device, sampling the magnitude of the signal carried therein, and identifying a conductor having a signal magnitude larger than a predetermined minimum, b2) a means for switchably connecting a conductor connected to the selected selector device to the output thereof; and, c) a means connected to the selector logic means for switchably connecting the input of the half frequency detection means and the second input of the cursor phase reference signal generator means through said amplifier to one of (i) the output of the first selector device, and (ii) the output of the second selector device.

6. The device for imparting the signal phase status of claim 5, wherein the half frequency detection means comprises:

a) a bandpass filter having an input connected through said amplifier to the output of the selected selector device and which filters out essentially all signals except the half frequency signal, and outputs said half frequency signal at an output;

b) a frequency detector having an input connected to the output of the bandpass filter which detects the half frequency signal output by the bandpass filter, and which outputs at an output the signal having a voltage consistent with the predetermined high logic level when said half frequency signal is detected; and c) a comparator having first and second inputs, the first input being connected to the output of the bandpass filter and the second input being connected to ground, said comparator outputting at an output a digital representation of the half frequency signal.

7. The device for imparting the signal phase status of claim 5, wherein the synch pulse generator means comprises:
   a) a first flip flop having a clock input, a state input, and a state output wherein the clock input is connected to the output of the comparator in the half frequency detection means and the state input is connected to the output of the frequency detector in the half frequency detection means, said first flip flop state input and output being initially set at low logic levels;
   b) a second flip flop having a clock input, a state input, and a state output wherein the clock input is connected to the output of the comparator in the half frequency detection means and the state input is connected to the state output of the first flip flop, said second flip flop state input and output being initially set at low logic levels;
   c) a third flip flop having a clock input, a state input, and an inverting state output wherein the clock input is connected to the output of the comparator in the half frequency detection means and the state input is connected to the state output of the second flip flop, said third first flip flop state input and inverting state output being initially set at low logic levels; and,
   d) a logical AND gate having a first and second input, and an output, wherein the first input is connected to the state output of the second flip flop and the second input is connected to the inverting state output of the third flip flop.

8. The device for imparting the signal phase status of claim 5, wherein the cursor phase reference signal generator means comprises:
   a) a free-running divide down counter having a first input connected to the output of the logical AND gate of the synch pulse generator means such that the counter is reset whenever said single pulse output from the synch pulse generator means is present and a second input connected to a signal source having a higher frequency than that of the basic cursor signal, said higher frequency signal being used to drive the counter, and whereby said cursor phase reference signal is approximately 180 degrees out of phase with the basic cursor signal and is output at the counter output whenever the counter is restarted;
   b) a synch demodulator means having a first input connected to the output of the counter and a second input connected through the amplifier to the output of the selected selector device which outputs a copy of the signal induced in a selected conductor by the AC magnetic field signal transmitting from the cursor, said conductor having a signal magnitude larger than the predetermined minimum, and whereby a signal is output at a synch demodulator output which has a positive voltage whenever the signals input at the first and second inputs are closer to being in phase than 180 degrees out of phase and which has a negative voltage whenever the signals input at the first and second inputs are closer to being 180 degrees out of phase than to being in phase; and
   c) a selective signal inverter means having a first input connected to the output of the synch demodulator means and a second input connected through the amplifier to the output of the selected selector device whereby said copy of the signal induced in the conductor is converted to a digital representation thereof and output directly at a selective signal inverter output whenever the signal input by the synch demodulator means has a negative voltage, and whereby said copy of the signal induced in the conductor is converted to a digital representation thereof and inverted prior to being output at the selective signal inverter output whenever the signal input by the synch demodulator means has a positive voltage.

9. The device for imparting the signal phase status of claim 8, wherein the selective signal inverter means comprises:
   a) a first comparator having a first input connected to the output of the synch demodulator means and a second input connected to ground, whereby a digital representation of the signal output by the synch demodulation means is output at a first comparator output;
   b) a microcontroller having an input connected to the output of the first comparator, the microcontroller outputting from a microcontroller output a signal having a low logic level voltage whenever the output from the first comparator is low and a high logic level whenever the output from the first comparator is high;
   c) a second comparator having a first input connected to the output from the selected selector device and a second input connected to ground, whereby a digital representation of the copy of the signal induced in the conductor by the AC magnetic field signal transmitting from the cursor is output at a second comparator output; and,
   d) a logical exclusive OR gate having a first input connected to the output of the microcontroller and a second input connected to the output of the second comparator, whereby a digital representation of said copy of the signal induced in the conductor is output at a gate output whenever the signal from the microcontroller is low and an inverted digital representation of said copy of the signal induced in the conductor is output from the gate output whenever the signal from the microcontroller is high.

10. A cordless digitizer including a cursor which emits a basic alternating current (AC) magnetic field signal and a tablet with a grid of conductors, and wherein the basic AC magnetic field signal induces a corresponding signal in the grid of conductors, and further comprising:
   a) a means for causing the cursor to temporarily emit a signal having a frequency which is lower than the frequency of a basic cursor signal instead of the basic AC magnetic field signal; and,
   b) a means for determining and imparting the signal phase status of the basic AC magnetic field signal transmitting from the cursor from a signal induced in the grid of conductors of the tablet by the signal transmitting from the cursor, using the temporarily emitted lower frequency signal.

11. The cordless digitizer of claim 10, wherein the cursor includes a basic cursor signal frequency generator for generating a signal having a predetermined frequency from an output thereof and a means connected to the output of the basic cursor signal generator which creates and emits from the cursor an AC magnetic field signal having a frequency equivalent to a frequency of a signal input into it, and wherein the lower frequency cursor signal means comprises:
- a) a divide-by-two circuit means for outputting a signal which has a frequency one-half that of a signal input into it;
- b) a means for switching the signal generated by the basic cursor signal frequency generator from the AC magnetic field signal creating and emitting means to an input of the divide-by-two circuit means;
- c) a half frequency cursor signal logic means which controls the switching means and causes the signal output from the basic cursor signal frequency generator to be temporarily switched to the input of the divide-by-two circuit means; and,
- d) a means for connecting an output of the divide-by-two circuit means to the AC magnetic field signal creating and emitting means to cause the emitting of an AC magnetic field signal having a frequency one-half that of the signal generated by the basic cursor signal frequency generator.

12. The cordless digitizer of claim 11, wherein the half frequency cursor signal logic means includes additional logic means to cause the temporary switching the signal output from the basic cursor signal frequency generator to the input of the divide-by-two circuit means at a time immediately preceding an emitting of a signal used to determine cursor position, thereby temporarily causing said AC magnetic field signal emitted from the cursor to have a frequency one-half that of the signal generated by the basic cursor signal frequency.

13. The cordless digitizer of claim 11, wherein the determining and imparting means comprises:
- a) a half frequency detection means including an input connected to said conductor for,
  - a1) isolating the half frequency signal induced in the conductor from a remaining portion of a signal induced in the conductor by the cursor emanations, the remaining portion having a frequency equal to that of the basic cursor frequency,
  - a2) detecting the isolated half frequency signal,
  - a3) outputting from a first output a signal having a voltage consistent with a predetermined high logic level employed in the determining and imparting means when said half frequency signal is detected, and,
  - a4) outputting from a second output a copy of the isolated half frequency signal;
- b) a synch pulse generator means, including first and second inputs respectively connected to the first and second outputs of the half frequency detection means, for outputting at an output a single pulse having a voltage consistent with the high logic level and whose transitions correspond to transitions of the induced half frequency signal, said single pulse being generated from the signals obtained from the first and second outputs of the half frequency detection means; and,
- c) a cursor phase reference signal generator means, including a first and second input respectively connected to the output of the synch pulse generator means and an output from the conductor containing a copy of the signal induced in said conductor by the AC magnetic field signal transmitting from the cursor, for generating a cursor phase reference signal at an output which has approximately the same frequency as and a known phase relationship to the basic cursor signal, said cursor phase reference signal being generated from the signal obtained from the synch pulse generator means and the conductor.

14. The cordless digitizer of claim 13 further comprising:
- a) a plurality of said conductors which form a two coordinate grid;
- b) a first and second selector device such that the conductors in one coordinate direction are connected to the first selector device and the conductors in the other coordinate direction are connected to the second selector device, each selector device having an output which is switchably connected to each conductor connected to the selector device such that an individual conductor can be connected to the output exclusive of the other conductors;
- c) a selector logic means connected to the first and second selector devices for selecting one of the selector devices such that the output therefrom is connected through an amplifier to the input of the half frequency detection means and the second input of the cursor phase reference signal generator means, and wherein said selector logic means includes:
  - c1) a means for individually selecting each conductor connected to the selected selector device, sampling the magnitude of the signal carried therein, and identifying a conductor having a signal magnitude larger than a predetermined minimum,
  - c2) a means for switchably connecting a conductor connected to the selected selector device to the output thereof; and,
- d) a means connected to the selector logic means for switchably connecting the input of the half frequency detection means and the second input of the cursor phase reference signal generator means through said amplifier to one of (i) the output of the first selector device, and (ii) the output of the second selector device.

15. In a cordless digitizer employing a cursor which emits a basic alternating current (AC) magnetic field signal and having a tablet with a grid of conductors, and wherein the basic AC magnetic field signal induces a corresponding signal in the grid of conductors, a method for imparting a signal phase status of the basic AC magnetic field signal transmitting from the cursor comprising the steps of:
- a) causing the cursor to temporarily emit a signal having a frequency which is lower than the frequency of a basic cursor signal instead of the basic cursor signal; and,
- b) determining and imparting the signal phase status of the basic AC magnetic field signal transmitting from the cursor from a signal induced in the grid of conductors of the tablet by the signal transmitting from the cursor, using the temporarily emitted lower frequency signal.

16. The method of claim 15 wherein the cursor includes a basic cursor signal frequency generator for generating a signal having a predetermined frequency from an output thereof and a means connected to the output of the basic cursor signal generator which creates and emits from the cursor an AC magnetic field signal having a frequency equivalent to a frequency of a signal input into it, and wherein said step of causing the cursor to temporarily emit a signal having a frequency which is lower than the frequency of a basic cursor signal comprises:

a) temporarily switching the signal generated by the basic cursor signal frequency generator from the AC magnetic field signal creating and emitting means to an input of a divide-by-two circuit means thereby creating a signal which has a frequency half that produced by the basic cursor frequency generator;

b) connecting an output of the divide-by-two circuit means to the AC magnetic field signal creating and emitting means to cause the temporary emitting of an AC magnetic field signal having a frequency half that of the signal generated by the basic cursor signal frequency generator;

c) disconnecting the output of the divide-by-two circuit means from the AC magnetic field signal creating and emitting means; and, d) switching the signal generated by the basic cursor signal frequency generator back to the AC magnetic field signal creating and emitting means from the input of a divide-by-two circuit means.

17. The method of claim 16, wherein said step of causing the cursor to temporarily emit a signal having a frequency which is half that of the frequency of a basic cursor signal further comprises the step of causing the temporary switching the signal output from the basic cursor signal frequency generator to the input of the divide-by-two circuit means at a time immediately preceding an emitting of a signal used to determine cursor position.

18. The method of claim 16, wherein said step of determining and imparting the signal phase status of the AC magnetic field signal comprises:

a) isolating the half frequency signal induced in the conductor from a remaining portion of a signal induced in the conductor by the cursor emanations, the remaining portion having a frequency equal to that of the basic cursor frequency;

b) detecting the isolated half frequency signal;

c) outputting a signal having a voltage consistent with a predetermined high logic level when said half frequency signal is detected;

d) outputting a single pulse having a voltage consistent with the high logic level and whose transitions correspond to transitions of the induced half frequency signal, said single pulse being generated from the signal output when the half frequency signal is detected and a copy of the isolated half frequency signal: and, e) generating a cursor phase reference signal which has approximately the same frequency as and a known phase relationship to the basic cursor signal, said cursor phase reference signal being generated from said single pulse and a copy of the signal induced in the conductor by the signal transmitting from the cursor.

19. The method of claim 18, wherein the signal induced in the conductor has a signal magnitude larger than a predetermined minimum comprising the step of selecting from the signals existing on a plurality of said conductors, a signal having a signal magnitude larger than a predetermined minimum.

* * * * *